United States Patent [19]

Lakey

[11] 4,281,277
[45] Jul. 28, 1981

[54] DUAL SECONDARY CELL CHARGING SYSTEM

[75] Inventor: Leroy E. Lakey, Anderson, Ind.

[73] Assignee: General Motors Corporation, Detroit, Mich.

[21] Appl. No.: 65,566

[22] Filed: Aug. 10, 1979

[51] Int. Cl.³ ............................ H02J 7/14; H02J 7/32
[52] U.S. Cl. ........................................ 320/6; 320/18
[58] Field of Search .................. 320/6, 15, 17, 18, 61; 322/28, 90

[56] References Cited

U.S. PATENT DOCUMENTS

| 3,560,832 | 2/1971 | Kirk | 320/15 X |
|---|---|---|---|
| 4,016,474 | 4/1977 | Mason | 320/15 |
| 4,041,363 | 8/1977 | Scheidler | 320/61 X |
| 4,044,293 | 8/1977 | Follmer | 320/61 X |
| 4,047,088 | 9/1977 | Himmler | 320/6 |
| 4,090,122 | 5/1978 | Hoinski | 320/6 |
| 4,179,647 | 12/1979 | Cummins et al. | 320/6 |

FOREIGN PATENT DOCUMENTS

| 2650851 | 5/1978 | Fed. Rep. of Germany | 322/90 |
|---|---|---|---|
| 2813987 | 10/1978 | Fed. Rep. of Germany | 320/15 |

Primary Examiner—Stanley J. Witkowski
Assistant Examiner—Richard M. Moose
Attorney, Agent, or Firm—Richard G. Stahr

[57] ABSTRACT

A separable series of secondary cells is connected across a charge circuit upon the application of supply potential. When the charge potential level upon a selected portion of the secondary cell series attains a predetermined magnitude, the selected portion is disconnected from the charge circuit. When the charge potential level upon the remainder of the secondary cell series subsequently attains a predetermined magnitude, all of the secondary cells are reconnected in series until the charge potential level upon all of the secondary cells of the series attains another higher predetermined potential level at which time the charge circuit is disabled.

5 Claims, 1 Drawing Figure

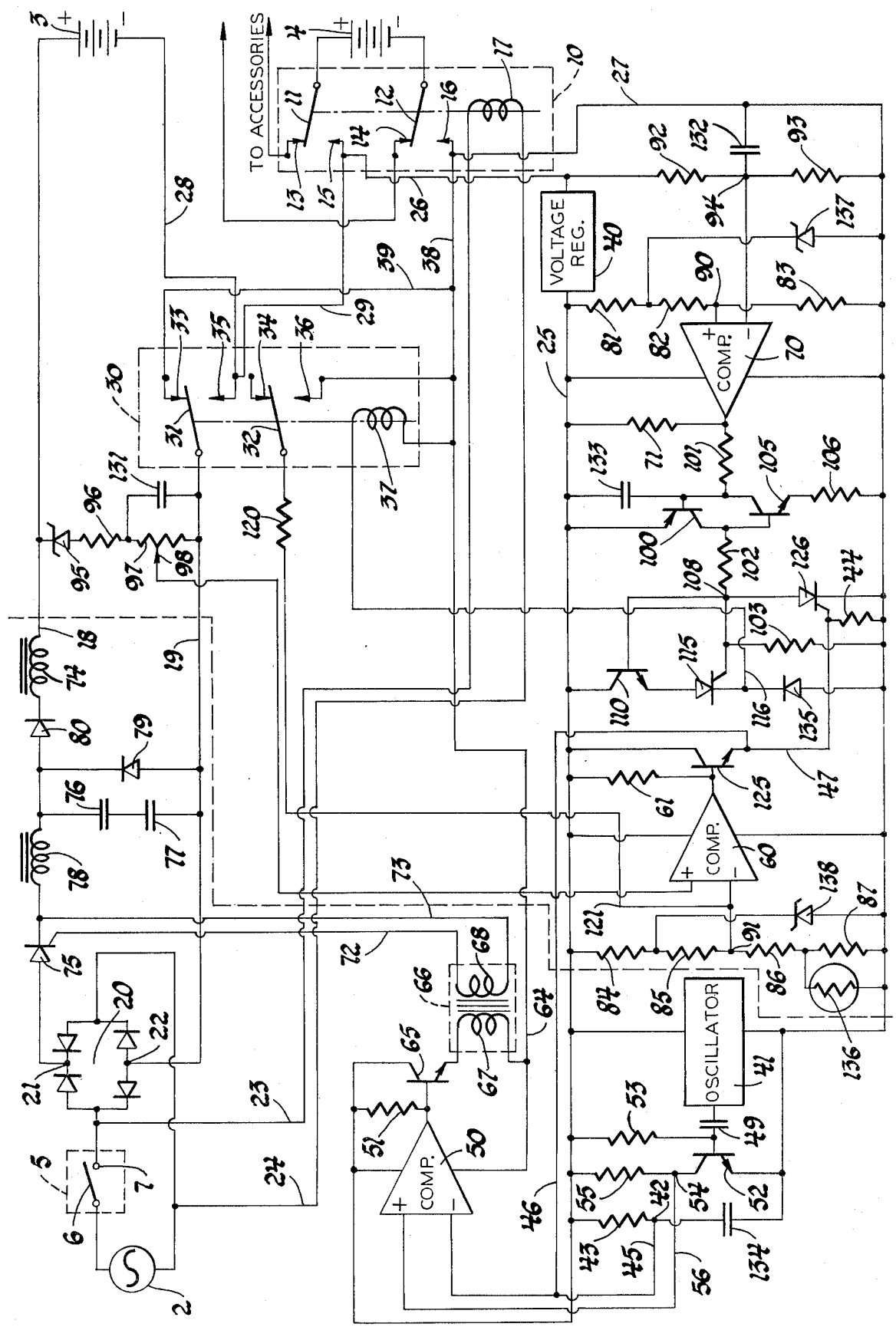

DUAL SECONDARY CELL CHARGING SYSTEM

This invention is directed to a secondary cell charging system and, more specifically, to a dual secondary cell charging system that is capable of initially charging a separable series of secondary cells, of disconnecting a selected portion of the series from the charge circuit when the charge thereupon reaches a predetermined magnitude, of reconnecting all of the cells in series when the charge upon the remainder reaches a predetermined magnitude and automatically disabling the charge potential producing arrangement when the charge upon all of the series of secondary cells reaches a predetermined magnitude.

A "secondary cell" is a voltaic cell in which the electrochemical action is reversible so that the cell can be repeatedly charged, discharged, and recharged. As is well known in the art, a storage battery may be a single secondary cell or a plurality of electrically interconnected secondary cells. In the modern automotive art, for example, the vehicle storage "battery" is six (6) secondary cells connected in series. In this specification, therefore, the term "storage battery" or "battery" includes both a unit comprised of one secondary cell and a unit comprised of two or more electrically interconnected secondary cells.

It is anticipated that electrically powered vehicles of the future will employ a series of secondary cells to supply vehicle motive power and a separate or separable series of secondary cells to supply vehicle accessory power. This may be provided through the use of a motive power series of secondary cells or battery pack and a separate or separable accessory power series of secondary cells or battery or through the use of a separable series of secondary cells that may separately supply motive and accessory power. Normally, the state of charge of the accessory power series of secondary cells or battery, the amount of recoverable energy in the secondary cell series or battery, is different than that of the motive power series of secondary cells or battery pack. Consequently, different charge schedules are required. In the prior art, the accessory power series of secondary cells or battery has been charged by a generator driven off the vehicle drive motor, by receiving a charge from the motive power series of secondary cells or battery pack, or by a separate charger. Although the voltage requirement for the motive power series of secondary cells or battery pack is much higher than the voltage requirement for the accessory power series of secondary cells or battery, perhaps as much as three hundred volts DC or more versus twelve volts DC, it would be advantageous to charge both secondary cell series with the same secondary cell charging system having a single output charge potential that is capable of charging both series to rated charge potential magnitude without overcharging the accessory power series.

It is, therefore, an object of this invention to provide an improved dual secondary cell charging system;

It is another object of this invention to provide an improved dual secondary cell charging system that is capable of charging a separable series of secondary cells with a single charge potential source.

It is an additional object of this invention to provide an improved dual secondary cell charging system that is capable of charging a separable series of secondary cells with a single charge potential source and that is operative to disconnect a selected separable portion of the secondary cell series from the charging circuit when the charge thereupon has attained a predetermined magnitude, to reconnect all of the secondary cells across the charge potential source when the charge potential upon the remainder has attained a predetermined magnitude and to disable the charge potential source when the charge potential across all of the secondary cells attains a higher predetermined magnitude.

In accordance with this invention, a dual secondary cell charging system for charging a series of separable secondary cells is provided wherein the series of secondary cells is initially connected across a charge circuit, a selected separable portion of the series is disconnected from the charge circuit when the charge thereupon reaches a predetermined magnitude, the selected separable portion is reconnected in series with the remainder of the secondary cells of the series across the charge circuit when the charge upon the remainder of the series has reached a predetermined magnitude and the charge potential producing circuit is disabled when the charge potential across all of the secondary cells of the series reaches another higher predetermined magnitude.

For a better understanding of the present invention, together with additional objects, advantages and features thereof, reference is made to the following description and accompanying single FIGURE drawing which sets forth the novel dual secondary cell charging system of this invention in schematic form.

The dual secondary cell charging system of this invention employs three conventional voltage comparator circuits referenced by the numerals 50, 60 and 70. As these circuit elements may be commercially available items well known in the art and, per se, form no part of this invention, each has been illustrated in block form in the drawing. Furthermore, these devices are only examples of circuit elements suitable for use with the circuit of this invention, consequently, there is no intention or inference of a limitation thereto as other circuit elements having similar electrical characteristics may be substituted therefor without departing from the spirit of the invention. The voltage comparator circuits employed in an actual embodiment are of the type marketed by National Semiconductor Corporation under the designation LM139.

The output terminal of each of the voltage comparator circuits employed in the actual embodiment is the uncommitted collector electrode of a grounded emitter NPN transistor. Therefore, each requires an external "pull-up" resistor referenced in the drawing by respective reference numerals 51, 61 and 71. With each of these devices, while the signal applied to the plus (+) input terminal is of a positive potential magnitude greater than that of the signal applied to the minus (−) input terminal, the NPN transistor output device is not conductive and the output signal upon the output terminal is of a positive polarity and of a magnitude substantially equal to supply potential and while the signal applied to the plus (+) input terminal is of a potential magnitude less than that of the signal applied to the minus (−) input terminal, the NPN transistor output device is conductive through the collector-emitter electrodes and the output signal upon the output terminal is substantially ground potential.

The separable series of secondary cells that may be charged by the dual secondary cell charging system of this invention is illustrated in the drawing as a motive power battery pack 3 and an accessory battery 4 with the series of secondary cells comprising accessory battery 4 being a selectively separable portion of the secondary cell series. The selected separable portion of the series of secondary cells comprising accessory battery 4 is connected across movable contacts 11 and 12 of a conventional double pole, double throw electrical relay 10 having an operating coil 17. While double pole, double throw relay operating coil 17 is deenergized as illustrated in the drawing, the positive and negative polarity output terminals of the selected separable portion of the secondary cell series comprising accessory battery 4 is connected across the vehicle accessory circuit through movable contacts 11 and 12 of relay 10 and respective normally closed stationary contacts 13 and 14 to which the respective movable contacts are spring biased into electrical contact while operating coil 17 is deenergized.

The circuitry to the left of the dashed line as viewing the drawing illustrates a conventional secondary cell charging circuit for producing a direct current charge potential that is suitable for use with the dual secondary cell charging system of this invention. While this circuit is operating in a manner to be later explained in detail in this specification, a direct current charge potential is present across output positive polarity bus 18 and output negative polarity bus 19.

A conventional alternating current supply potential source having a potential and current rating sufficient to supply the required charge potential and current is illustrated in block form in the drawing and is referenced by the numeral 2. To activate this system, movable contact of an electrical switch 5 is operated into electrical circuit closing engagement with stationary contact 7. Upon the closure of movable contact 6 of electrical switch 5 into electrical circuit closing engagement with stationary contact 7, the alternating current supply potential source 2 is connected across the alternating current input terminals of a conventional four-diode, single phase, full-wave rectifier circuit 20 having positive and negative polarity output terminals 21 and 22, respectively, and, through leads 23 and 24, across the operating coil 17 of double pole, double throw relay 10. Therefore, upon the closure of switch 5 to energize operating coil 17, movable contacts 11 and 12 of relay 10 are gang-operated out of electrical circuit closing engagement with respective stationary contacts 13 and 14 and into electrical circuit closing engagement with respective stationary contacts 15 and 16. Upon the application of supply potential to energize operating coil 17 of relay 10, therefore, relay 10 effects the disconnection of the selected separable series of secondary cells comprising accessory battery 4 from across the accessory circuits, effects the connection of this secondary cell series across positive polarity potential lead 26 and negative polarity potential lead 27 and effects the connection of all of the secondary cells in series across the charge potential through a circuit that may be traced from positive polarity bus 18, through the series of secondary cells comprising motive power battery pack 3, leads 28 and 29, stationary contact 15 and movable contact 11 of relay 10, the series of secondary cells comprising accessory battery 4, movable contact 12 and stationary contact 16 of relay 10, leads 38 and 39 and normally closed stationary contact 33 and movable contact 31 of a conventional double pole, double throw electrical relay 30 to the negative polarity bus 19. The direct current potential appearing across respective positive and negative polarity potential leads 26 and 27 while switch 5 is closed is regulated to a predetermined voltage by a conventional voltage regulator circuit 40 which may be any of the many conventional voltage regulator circuits well known in the art. As voltage regulator circuit 40, per se, forms no part of this invention, it is illustrated in the drawing in block form. The output of voltage regulator circuit 40 appears as a regulated potential across the regulated positive and negative polarity potential leads 25 and 27, respectively.

The regulated potential across regulated positive and negative polarity potential leads 25 and 27, respectively, supplies operating potential to a conventional oscillator circuit 41 and the previously mentioned conventional voltage comparator circuits 50, 60 and 70. As these circuit elements may be any of the many types well known in the art and, per se, form no part of this invention, each is illustrated in the drawing in block form. A reference potential appearing upon junction 42 between series resistors 43 and 44, interconnected through leads 45, 46 and 47 across regulated positive and negative polarity potential leads 25 and 27, is applied through lead 45 to the minus (−) input terminal of comparator circuit 50. The output signals of oscillator circuit 41 are applied through coupling capacitor 49 to the base electrode of NPN transistor 52. As a base bias resistor 53 is connected between the regulated positive polarity potential lead 25 and the base electrode of transistor 52, this device is normally conductive through the collector-emitter electrodes thereof. During each negative polarity half cycle of the oscillator circuit 41 output signals, the base electrode of transistor 52 goes negative to render this device not conductive. Therefore, transistor 52 is alternately rendered conductive and not conductive during the positive and negative polarity half cycles, respectively, of the output signals of oscillator circuit 41. While transistor 52 is not conductive, a positive polarity potential signal is present upon junction 54 between resistor 55 and the collector electrode of transistor 52 and is applied through lead 56 to the plus (+) input terminal of comparator circuit 50. As this signal is arranged to be of a positive polarity potential magnitude greater than that of the signal present upon junction 42, each time transistor 52 is triggered not conductive during a negative polarity half cycle of the output signals of oscillator circuit 41, comparator circuit 50 is triggered to the condition in which the output signal thereof is of a positive polarity and of a magnitude substantially equal to supply potential. This output signal supplies base-emitter drive current to NPN transistor 65 to render this device conductive through the collector-emitter electrodes. Upon the conduction of transistor 65 through the collector-emitter electrodes, primary winding 67 of pulse transformer 66 is energized through a circuit that may be traced from the regulated positive polarity potential lead 25, the collector-emitter electrodes of transistor 65, primary winding 67 and lead 64 to negative polarity potential lead 27. While transistor 52 is conductive during a positive half cycle of output signals of oscillator circuit 41, a substantially ground potential signal is present upon junction 54. As this signal is of a potential magnitude less than that of the signal present upon junction 42, each time transistor 52 is triggered conductive during a positive polarity half cycle of the output signals of oscillator circuit 41, comparator circuit 50 is triggered to the condition in which the output signal thereof is substantially ground potential. As this ground potential signal does not supply base-emitter drive current to the base electrode of transistor 65, this device is rendered not conductive through the collector-emitter electrodes. While transistor 65 is not conductive, the previously described energizing circuit for primary winding 67 of pulse transformer 66 is interrupted. Consequently, primary winding 67 of pulse transformer 66 is periodically energized and deenergized at a frequency equal to the output signal frequency of oscillator circuit 41. In the actual embodiment, this output signal frequency is of the order of 2500 Hertz. As the resulting potential pulses induced in secondary winding 68 of pulse transformer 66 are applied through leads 72 and 73 across the gate-cathode electrodes of silicon controlled rectifier 75 of the conventional secondary cell charging circuit, secondary winding 67 supplies a series of electrical gate pulses at a frequency equal to the oscillator circuit 41 output signal frequency across the gate-cathode electrodes of this silicon controlled rectifier in the proper relationship to produce gate current therethrough and, consequently, anode-cathode conduction thereof.

Upon the gating of silicon controlled rectifier 75 conductive through the anode-cathode electrodes, capacitors 76 and 77 are charged across the positive and negative polarity output terminals 21 and 22, respectively, of bridge rectifier circuit 20 through inductor element 78. As capacitors 76 and 77 and inductor element 78 form a resonant charging circuit, capacitors 76 and 77 therefore charge to a potential approximately 1.7 times the direct current output potential of bridge rectifier circuit 20. Upon the charge of capacitors 76 and 77, silicon controlled rectifier 75 is rendered not conductive as the potential upon the cathode is now raised to a magnitude higher than that upon the anode. Upon the turn-off of silicon controlled rectifier 75, capacitors 76 and 77 discharge through inductor element 74 and any load connected across the respective positive and negative polarity buses 18 and 19. Upon the discharge of capacitors 76 and 77, the current through inductor element 74 abruptly decreases in value to produce a reversal of potential thereacross. Consequently, the energy stored in inductor element 74 is supplied to an external load connected across positive and negative polarity buses 18 and 19 through a circuit that includes diodes 79 and 80. Upon the operation of the circuit just described, therefore, a direct current charge potential appears across the positive and negative polarity buses 18 and 19, respectively. The amount of power applied to any secondary cell charging load connected across respective positive and negative polarity buses 18 and 19 is a function of $\frac{1}{2} CE^2$ times the pulse frequency of silicon controlled rectifier 75 where C is the capacitance of capacitors 76 and 77 and E is the voltage to which capacitors 76 and 77 are charged. It will be appreciated, therefore, that the power that may be supplied to a secondary cell charging load connected across respective positive and negative polarity buses 18 and 19 will be a function of the switching frequency of silicon controlled rectifier 75.

To produce a reference potential of a magnitude indicative of a predetermined charge potential level upon the selected separable portion of the series of secondary cells as represented by accessory battery 4 while regulated positive and negative polarity potential leads 25 and and 27 are energized, resistors 81, 82 and 83 are connected in series across the regulated positive and negative polarity potential leads 25 and 27. To produce another reference potential of a magnitude indicative of a predetermined charge potential level upon all of the secondary cells in series including those secondary cells comprising motive power battery 3 and accessory battery 4 while regulated positive and negative polarity potential leads 25 and 27 are energized, series resistors 84, 85, 86 and 87 are also connected across regulated positive and negative polarity potential leads 25 and 27. As the charge upon a secondary cell or a series of secondary cells increases, a point is reached at which the rate of change of the terminal voltage increases. This point is known in the art as the "voltage lid" and is usually between 80% and 90% of full charge. The resistance values of series resistors 81, 82 and 83 are so proportioned relative to each other that, while regulated positive and negative polarity potential leads 25 and 27 are energized, the reference potential appearing upon junction 90 is substantially equal to a selected proportion of the predetermined "voltage lid" potential level of the series of secondary cells comprising accessory battery 4. The resistance values of series resistors 84, 85, 86 and 87 are so proportioned relative to each other that, while regulated positive and negative polarity potential leads 25 and 27 are energized, the reference potential appearing upon junction 91 is substantially equal to a selected proportion of the predetermined potential level to which all of the secondary cells in series including those secondary cells comprising motive power battery pack 3 and accessory battery 4 are to be charged.

To produce a sense potential indicative of the charge potential level of the series of secondary cells comprising accessory battery 4 while positive and negative polarity potential leads 26 and 27 are energized, the potential of this series of secondary cells is applied across series resistors 92 and 93 through positive and negative polarity potential leads 26 and 27. The resistance values of series resistors 92 and 93 are so proportioned relative to each other that, when the series of secondary cells comprising accessory battery 4 has been charged to a predetermined potential level substantially equal to the "voltage lid" of this series, a sense potential of a magnitude substantially equal to the reference potential present upon junction 90 appears upon junction 94. As has been brought out previously in this specification, the resistance values of series resistors 81, 82 and 83 are so proportioned relative to each other that the reference potential appearing upon junction 90 is substantially equal to a selected proportion of the predetermined "voltage lid" potential level of the series of secondary cells comprising accessory battery 4. Therefore, the sense potential appearing upon junction 94 is of a magnitude substantially equal to that of the reference potential upon junction 90 when the series of secondary cells comprising accessory battery 4 has been charged to a predetermined potential level substantially equal to the "voltage lid" potential level thereof.

To produce a sense potential indicative of the charge potential level of those secondary cells that are connected across positive and negative polarity buses 18 and 19 while energized, a Zener diode 95, a resistor 96 and a variable resistor 97 having a movable contact 98 are connected in series across the respective positive and negative polarity buses 18 and 19. The movable contact 98 of variable resistor 97 is adjusted to the point at which, when all of the secondary cells in series including those secondary cells comprising motive power battery 3 and accessory battery 4 have been charged to the predetermined potential level to which this series is to be charged, a sense potential of a magnitude equal to the reference potential upon junction 91 appears across this movable contact and negative polarity bus 19. As has been brought out previously in this specification, the resistance values of series resistors 84, 85, 86 and 87 are so proportioned relative to each other that the reference potential appearing upon junction 91 is substantially equal to a selected proportion of the predetermined potential level to which all of the secondary cells in series including those secondary cells comprising motive power battery pack 3 and accessory battery 4 are to be charged. Therefore, the sense potential appearing across the movable contact 98 of variable resistor 97 and negative polarity potential bus 19 is of a magnitude substantially equal to that of the reference potential upon junction 91 when all of the secondary cells in series have been charged to the predetermined potential level to which this series is to be charged.

From this description it is apparent that, while regulated positive and negative polarity potential leads 25 and 27 are energized, series resistors 81, 82 and 83 produce a reference potential upon junction 90 of a magnitude indicative of a predetermined charge potential level upon a selected separable portion of the series of secondary cells, those cells comprising accessory battery 4, and that series resistors 84, 85, 86 and 87 produce another reference potential upon junction 91 of a magnitude indicative of a predetermined charge potential level upon all of the secondary cells in series.

The sense potential appearing across the movable contact 98 of variable resistor 97 and negative polarity potential bus 19 and the reference potential upon junction 91 are applied, respectively, to the plus (+) and minus (−) input terminals of comparator circuit 60. Consequently, when this sense potential is of a magnitude less than that of this reference potential, a substantially ground potential signal is present upon the output terminal of comparator circuit 60 and when this sense potential is of a magnitude substantially equal to and greater than that of this reference potential, a positive polarity potential is present upon the output terminal of comparator circuit 60.

The reference potential upon junction 90 and the sense potential upon junction 94 are applied, respectively, to the plus (+) and minus (−) input terminals of comparator circuit 70. Consequently, when this sense potential is of a magnitude less than that of this reference potential, a positive polarity potential is present upon the output terminal of comparator circuit 70 and when this sense potential is of a magnitude substantially equal to and greater than this reference potential, a substantially ground potential signal is present upon the output terminal of comparator circuit 70.

Upon the closure of movable contact 6 of switch 5 to stationary contact 7, a charge potential appears across positive and negative polarity buses 18 and 19 and operating coil 17 of relay 10 is energized. Upon the energization of operating coil 17, movable contacts 11 and 12 of relay 10 are gang-operated out of electrical circuit closing engagement with respective stationary contacts 13 and 14 and into electrical circuit closing engagement with respective stationary contacts 15 and 16 to connect all of the secondary cells of the series across the charge potential, the potential across positive and negative polarity buses 18 and 19, through a previously described circuit. Therefore, all of the secondary cells of the series begin to take a charge.

When the charge potential level upon the selected separable portion of the series of secondary cells comprising accessory battery 4 has attained the predetermined magnitude, the sense potential upon junction 94 is of a magnitude substantially equal to that of the reference potential upon junction 90. Consequently, comparator circuit 70 switches to the condition in which a substantially ground potential signal is present upon the output terminal thereof. With a substantially ground potential signal present upon the output terminal of comparator circuit 70, emitter-base drive current is supplied to PNP transistor 100 through a circuit that may be traced from the regulated positive polarity potential lead 25, through the emitter-base electrodes of PNP transistor 100, resistor 101 and the collector-emitter electrodes of the output device of comparator circuit 70 to the negative polarity potential lead 27. This emitter-base drive current triggers PNP transistor 100 conductive through the emitter-collector electrodes thereof to complete a circuit through which current flows through resistors 102 and 103 and through which base-emitter drive current is supplied to NPN transistor 105 through a circuit that may be traced from the regulated positive polarity potential lead 25, through the emitter-collector electrodes of transistor 100, the base-emitter electrodes of transistor 105 and resistor 106 to negative polarity potential lead 27. This base-emitter drive current triggers transistor 105 conductive through the collector-emitter electrodes to latch transistor 100 conductive. The flow of current through resistors 102 and 103 produces a positive polarity potential signal upon junction 108 that supplies base-emitter drive current to NPN transistor 110 and gate-cathode gate current to silicon controlled rectifier 115 to trigger both of these devices conductive through the current carrying elements thereof. Upon the conduction of NPN transistor 110 through the collector-emitter electrodes and the conduction of silicon controlled rectifier 115 through the anode-cathode electrodes thereof, operating coil 37 of relay 30 is energized through a circuit that may be traced from the regulated positive polarity potential lead 25, through the collector-emitter electrodes of transistor 110, the anode-cathode electrodes of silicon controlled rectifier 115, lead 116, operating coil 37 of relay 30 and lead 38 to negative polarity potential lead 27.

Upon the energization of operating coil 37 of relay 30, movable contacts 31 and 32 thereof are gang-operated out of electrical circuit engagement with normally closed respective stationary contacts 33 and 34 and into electrical circuit engagement with respective stationary contacts 35 and 36. Upon the operation of movable contact 31 out of electrical circuit engagement with stationary contact 33 and into electrical circuit engagement with stationary contact 35, the selected separable portion of the series of the secondary cells, the secondary cells comprising accessory battery 4, are disconnected from the charge potential and only the remainder of the series of secondary cells, the secondary cells comprising motive power battery pack 3, are connected across the source of charge potential through a circuit that may be traced from positive polarity potential bus 18, the series of cells comprising motive power battery pack 3, lead 28, closed contacts 35 and 31 of relay 30 to negative polarity bus 19. Upon the operation of movable contact 32 out of electrical contact engagement with stationary contact 34 and into electrical circuit engagement with stationary contact 36, resistor 120 is connected in parallel with series resistors 86 and 87 through a circuit that may be traced from junction 91, through lead 121, resistor 120, the closed contacts 32 and 36 of relay 30 and lead 38 to negative polarity potential lead 27. This has the effect of reducing the magnitude of the reference potential upon junction 91 to produce another reference potential of a lower magnitude indicative of a predetermined charge potential level upon the remainder of the series of secondary cells. Therefore, the resistance value of resistor 120 is so proportioned relative to the sum of the resistance values of series resistors 86 and 87 that the reference signal now present upon junction 91 is substantially equal to a selected proportion of the predetermined "voltage lid" potential level of the remainder of the series of secondary cells. Therefore, this reference potential is indicative of a predetermined charge potential level upon the remainder of the series of secondary cells.

The circuitry just described, therefore, is responsive to the charge potential level upon the selected separable portion of the series of secondary cells attaining the predetermined charge potential level as indicated by the reference potential magnitude upon junction 90 for effecting the disconnection of only the selected portion of the series of secondary cells from the charge potential and for effecting the production of a reference potential upon junction 91 of a magnitude indicative of a predetermined charge potential level upon the remainder of the series of secondary cells;

When the charge potential level upon the remainder of the series of secondary cells comprising motive power battery pack 3 has attained the predetermined magnitude, the sense potential across movable contact 98 of variable resistor 97 and negative polarity bus 19 is of a magnitude substantially equal to that of the reference potential now present upon junction 91. Consequently, comparator circuit 60 switches to the condition in which a positive polarity potential is present upon the output terminal thereof to supply base-emitter drive current to NPN transistor 125 to trigger this device conductive through the collector-emitter electrodes. Upon the conduction of transistor 125 through the collector-emitter electrodes, a gate signal of a positive polarity potential is applied to the gate electrode of silicon controlled rectifier 126 through a circuit that may be traced from the regulated positive polarity potential lead 25 through the collector-emitter electrodes of transistor 125, lead 47 and the gate-cathode electrodes of silicon controlled rectifier 126 to negative polarity potential lead 27. This gate signal triggers silicon controlled rectifier 126 conductive through the anode-cathode electrodes as anode-cathode current is supplied thereto through a circuit that may be traced from regulated positive polarity potential lead 25, through the emitter-collector electrodes of conducting transistor 100, resistor 102 and the anode-cathode electrodes of silicon controlled rectifier 126 to negative polarity potential lead 27. Upon the conduction of silicon controlled rectifier 126, this device drains base-emitter drive current from transistor 110 to render this device not conductive. When transistor 110 goes not conductive, anode-cathode electrode current is no longer supplied to silicon controlled rectifier 115, consequently, this device is also rendered not conductive. When silicon controlled rectifier 115 goes not conductive, the previously described energizing circuit for energizing coil 37 of relay 30 is interrupted and, as a consequence, the movable contacts 31 and 32 thereof are spring bias gang-operated out of electrical circuit engagement with respective stationary contacts 35 and 36 and into electrical circuit engagement with respective stationary contacts 33 and 34. Upon the deenergization of operating coil 37 of relay 30, therefore, the selected separable portion of the series of secondary cells comprising accessory battery 4 are reconnected in series in the charge circuit through the previously described charge circuit and the reference potential upon junction 91 is restored to the original potential magnitude indicative of the predetermined charge potential level upon all of the secondary cells in series for the reason that resistor 120 is no longer connected in parallel with series resistors 86 and 87 subsequent to the operation of movable contact 32 of relay 30 out of electrical circuit engagement with stationary contact 36. As anode-cathode current continues to be supplied to silicon controlled rectifier 126 through the previously described circuit and since transistor 100 remains locked conductive as previously described, silicon controlled rectifier 126 remains conductive until movable contact 6 of switch 5 is operated out of electrical circuit engagement with stationary contact 7. As a consequence, conductive silicon controlled rectifier 126 disables the previously described circuitry that is responsive to the charge potential level upon the selected separable portion of the series of secondary cells and comprises comparator circuit 70, transistors 100, 105 and 110, silicon controlled rectifier 115, relay 37 and the associated circuitry and maintains this circuitry disabled until movable contact 6 of switch 5 is operated out of electrical circuit engagement with atationary contact 7. When the series of secondary cells has become charged to the predetermined potential level to which this series is to be charged, the sense potential present upon movable contact 98 of variable resistor 97 is substantially equal to the reference potential upon junction 91. Consequently, comparator circuit 60 switches to the condition in which a positive polarity signal is present upon the output terminal thereof. As previously described, this positive polarity signal supplies base-emitter drive current to transistor 125 to render this device conductive through the collector-emitter electrodes. Upon the conduction of transistor 125, a positive polarity signal appears across resistor 44 and, in addition to supplying gate current to silicon controlled rectifier 126 as previously described, it is also applied through leads 46 and 45 to the minus (—) input terminal of comparator circuit 50. As this signal is arranged to be of a positive polarity potential magnitude greater than that of the signal upon junction 54 while transistor 52 is not conductive and that is applied to the plus (+) input terminal of comparator circuit 50, in response to this signal across resistor 44, comparator circuit 50 switches to the condition in which a substantially ground potential signal is present upon the output terminal thereof and is maintained in this condition so long as transistor 125 remains conductive. As this ground potential signal supplies no base-emitter drive current to transistor 65, this device is maintained not conductive to maintain the previously described pulse transformer 66 primary winding 67 energizing circuit interrupted. As a consequence, pulse transformer 66 no longer supplies gate signals to silicon controlled rectifier 75 of the previously described charge potential producing circuitry. Consequently, the circuitry for producing the charge potential is disabled.

From this discussion, it is apparent that the circuitry including comparator circuit 60, transistor 125 and silicon controlled rectifier 126 is responsive to the charge potential level upon the remainder of the series of secondary cells attaining the predetermined charge potential level as indicated by the reduced reference potential magnitude present upon junction 91 for (1) disabling the previously described circuitry that is responsive to the charge potential level upon the selected separable portion of the series of secondary cells, for (2) effecting the reconnection of all of the secondary cells in series across the charge potential and for (3) effecting the restoration of the reference potential magnitude upon junction 91 and is responsive to the charge potential level upon all of the secondary cells in series attaining the predetermined charge potential level as indicated by the restored reference potential magnitude upon junction 91 for disabling the means for producing the charge potential.

Should the charge potential level upon the series of secondary cells fall below the predetermined charge potential level, the sense potential appearing across movable contact 98 of variable resistor 97 and negative polarity bus 19 would reduce to a value less than that of the reference potential upon junction 91. Consequently, comparator circuit 60 would switch to the condition in which the output signal thereof is substantially ground potential. As this substantially ground potential signal no longer supplies base-emitter drive current to transistor 125, this device goes not conductive. While transistor 125 is not conductive, the signal present upon junction 54 while transistor 52 is not conductive is of a sufficient potential magnitude to effect the switching of comparator circuit 50 to the condition in which a positive polarity potential signal is present upon the output terminal thereof. Consequently, through the action of oscillator circuit 41 and the circuitry previously described, the primary winding 67 of pulse transformer 66 is periodically completed and interrupted to produce a resulting series of gate signal pulses that are applied to silicon controlled rectifier 75. During this time, the series of secondary cells is again charged until the predetermined charge potential level is reached. At this time, the sense signal present upon movable contact 98 of variable resistor 97 is again substantially equal to the reference potential upon junction 91 to switch comparator circuit 60 to the condition in which a positive polarity signal is present upon the output terminal thereof. As this positive polarity signal supplies base-emitter drive current to transistor 125, the circuitry for producing the charge potential is again disabled as previously explained.

Capacitors 131, 132, 133 and 134 are filter capacitors; diode 135 is an isolating diode; thermistor 136 is a temperature compensating device; and Zener diodes 137 and 138 are transient suppressing devices.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. A dual secondary cell charging system for charging a separable series of secondary cells that is adapted for the application of a supply potential thereto comprising:

means for producing a direct current charge potential, said means being of the type that may be selectively disabled;

means responsive to the application of said supply potential for effecting the connection of all of said separable series of secondary cells in series across said charge potential;

means responsive to the charge potential level upon a portion of said separable series of secondary cells attaining a predetermined magnitude for effecting the disconnection of only said portion of said separable series of secondary cells from said charge potential; and means responsive to the charge potential level upon the remainder of said separable series of secondary cells attaining a first predetermined magnitude for effecting the reconnection of all of said separable series of secondary cells in series across said charge potential and to the charge potential level upon all of said separable series of seondary cells in series attaining a second higher predetermined magnitude for effecting the disabling of said means for producing said charge potential.

2. A dual secondary cell charging system for charging a separable series of secondary cells that is adapted for the application of a supply potential thereto comprising:

means for producing a direct current charge potential, said means being of the type that may be selectively disabled;

means responsive to the application of said supply potential for effecting the connection of all of said separable series of secondary cells in series across said charge potential;

means for producing a first reference potential of a magnitude indicative of a predetermined charge potential level upon all of said separable series of secondary cells in series;

means responsive to the charge potential level upon a portion of said separable series of secondary cells attaining a predetermined magnitude for effecting the disconnection of only said portion of said separable series of secondary cells from said charge potential and for effecting the production of a second reference potential of a magnitude indicative of a predetermined charge potential level upon the remainder of said separable series of secondary cells; and means responsive to the charge potential level upon said remainder of said separable series of secondary cells attaining the predetermined charge potential level as indicated by said second reference potential magnitude for disabling and maintaining disabled said means responsive to the charge potential level upon said portion of said separable series of secondary cells, for effecting the reconnection of all of said separable series of secondary cells in series across said charge potential and for effecting the restoration of said first reference potential magnitude and responsive to the charge potential level upon all of said separable series of secondary cells in series attaining the predetermined charge potential level as indicated by said first reference potential magnitude for disabling said means for producing said charge potential.

3. A dual secondary cell charging system for charging a separable series of secondary cells that is adapted for the application of a supply potential thereto comprising:

means for producing a direct current charge potential, said means being of the type that may be selectively disabled;

means responsive to the application of said supply potential for effecting the connection of all of said separable series of secondary cells in series across said charge potential;

first means for producing a first reference potential of a magnitude indicative of a predetermined charge potential level upon a portion of said separable series of secondary cells;

second means for producing a second reference potential of a magnitude indicative of a predetermined charge potential level upon all of said separable series of secondary cells in series;

means responsive to the charge potential level upon said portion of said separable series of secondary cells attaining the predetermined charge potential level as indicated by said first reference potential magnitude for effecting the disconnection of only said portion of said separable series of secondary cells from said charge potential and for effecting the production of a third reference potential of a magnitude indicative of a predetermined charge potential level upon the remainder of said separable series of secondary cells; and means responsive to the charge potential level upon said remainder of said separable series of secondary cells attaining the predetermined charge potential level as indicated by said third reference potential magnitude for effecting the reconnection of all of said separable series of seondary cells in series across said charge potential and for effecting the restoration of said second reference potential magnitude and responsive to the charge potential level upon all of said separable series of secondary cells in series attaining the predetermined charge potential level as indicated by said second reference potential magnitude for disabling said means for producing said charge potential.

4. A dual secondary cell charging system for charging a separable series of secondary cells that is adapted for the application of a supply potential thereto comprising:

means for producing a direct current charge potential, said means being of the type that may be selectively disabled;

means operable in response to the application of said supply potential to effect the connection of all of said separable series of secondary cells in series across said charge potential and to connect a portion of said separable series of secondary cells to reference potential producing circuitry including separate means for producing a first reference potential of a magnitude indicative of a predetermined charge potential level upon said portion of said separable series of secondary cells and a second reference potential of a magnitude indicative of a predetermined charge potential level upon all of said separable series of secondary cells in series;

means responsive to the charge potential level upon said portion of said separable series of secondary cells attaining the predetermined charge potential level as indicated by said first reference potential magnitude for effecting the disconnection of only said portion of said separable series of secondary cells from said charge potential and for effecting the production of a third reference potential of a magnitude indicative of a predetermined charge potential level upon the remainder of said separable series of secondary cells; and means responsive to the charge potential level upon said remainder of said separable series of secondary cells attaining the predetermined charge potential level as indicated by said third reference potential magnitude for disabling said means responsive to the charge potential level upon said portion of said separable series of secondary cells, for effecting the reconnection of all of said separable series secondary cells in series across said charge potential and for effecting the restoration of said second reference potential magnitude and responsive to the charge potential level upon all of said separable series secondary cells in series attaining the predetermined charge potential level as indicated by said second reference potential magnitude for disabling said means for producing said charge potential.

5. A dual secondary cell charging system for charging a separable series of secondary cells that is adapted for the application of a supply potential thereto comprising:

means for producing a direct current charge potential, said means being of the type that may be selectively disabled;

means operative in response to the application of said supply potential to effect the connection of all of said separable series of secondary cells in series across said charge potential and to connect a portion of said separable series of secondary cells to reference potential producing circuitry including separate means for producing a first reference potential of a magnitude indicative of a predetermined charge potential level upon said portion of said separable series of secondary cells and a second reference potential of a magnitude indicative of a predetermined charge potential level upon all of said separable series of secondary cells in series;

means responsive to the charge potential level upon said portion of said separable series of secondary cells attaining the predetermined charge potential level as indicated by said first reference potential magnitude for effecting the disconnection of only said portion of said separable series of secondary cells from said charge potential and for effecting the reduction of the magnitude of said second reference potential to a lower magnitude indicative of a predetermined charge potential level upon the remainder of said separable series of secondary cells; and means responsive to the charge potential level upon said remainder of said separable series of secondary cells attaining the predetermined charge potential level as indicated by said lower magnitude of said second reference potential for disabling said means responsive to the charge potential level upon said portion of said separable series of secondary cells, for effecting the reconnection of all of said separable series of secondary cells in series across said charge potential and for effecting the restoration of said second reference potential magnitude and responsive to the charge potential level upon all of said separable series of secondary cells in series attaining the predetermined charge potential level as indicated by said second reference potential magnitude for disabling said means for producing said charge potential.

* * * * *